Feb. 21, 1950     A. L. BOZZELLI     2,497,975
TIRE CHAIN APPLYING DEVICE

Filed Oct. 15, 1947

Albert L. Bozzelli
*INVENTOR.*

Clarence A. O'Brien
and Harvey B. Jacobson
*Attorneys*

Patented Feb. 21, 1950

2,497,975

UNITED STATES PATENT OFFICE 2,497,975

TIRE CHAIN APPLYING DEVICE

Albert L. Bozzelli, Bangor, Pa., assignor of twenty-five per cent to Vincent Angelino and twenty-five per cent to Firsty De Thomas, both of Bangor, and twenty-five per cent to Michael De Lesio, Roseto, Pa.

Application October 15, 1947, Serial No. 779,886

2 Claims. (Cl. 81—15.8)

This invention relates to new and useful improvements in tire chain applying devices, and the primary object of the present invention is to provide a device for use in attaching anti-skid chains to pneumatic tires in such a manner as to eliminate the necessity of having to employ a jack or other device for raising the tire.

Another important object of the present invention is to provide a tire chain applying device including novel and improved means for engaging a cross chain of the tire chain that is to be applied, so that the tire chain will not slip during its application to a tire.

A further object of the present invention is to provide a tire chain attaching device that is quickly and readily applied to or removed from a tire in a convenient manner.

A still further aim of the present invention is to provide a tire chain applying device that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
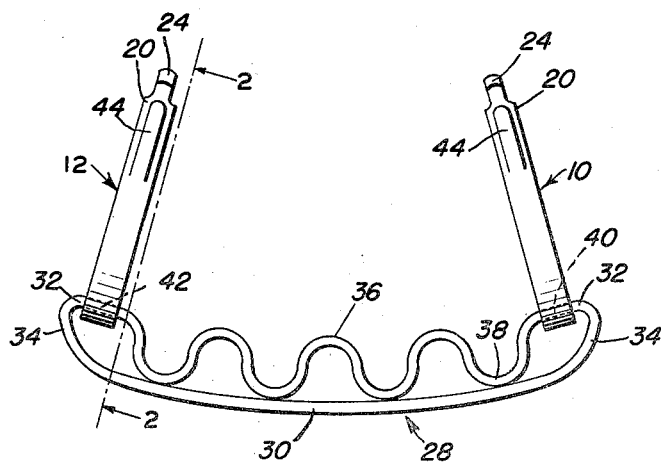
Figure 1 is an elevational view of the present tire chain applying device.
Figure 2:
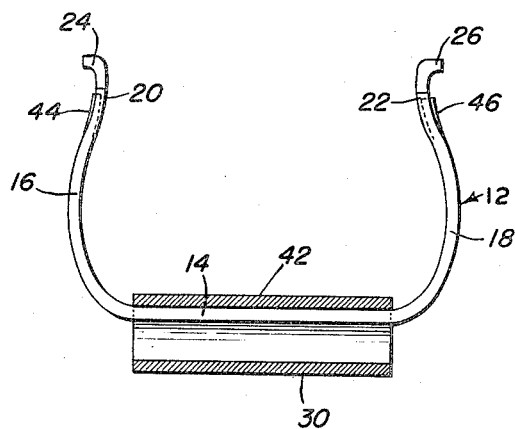
Figure 2 is a transverse vertical sectional view taken substantially on the plane of section line 2—2 of Figure 1.

Referring now to the drawings in detail wherein, for the purpose of illustration, there is disclosed the preferred embodiment of the present invention, the numerals 10 and 12 represent a pair of resilient, substantially U-shaped cross members generally, each comprising a substantially flat web portion 14, and arcuate leg portions 16 and 18. The outer free ends 20 and 22 of these leg portions 16 and 18 terminate in reduced, outwardly flared extensions 24 and 26 that expedite the frictional engagement of the members 10 and 12 upon a pneumatic tire, with the leg portions 16 and 18 frictionally bearing upon opposite sides of the tire.

The numeral 28 represents the cross chain engaging member generally, comprising an outer arcuate plate 30 and an opposed undulated inner plate 32. These plates are integrally connected at their outer terminals, as at 34. The inner humps or arcuate portions 36 of the undulated inner plate 32 bear upon the outer periphery of the tire. The outer humps or arcuate portions 38 of the undulated inner plate 32 frictionally bear upon the inner, opposed face of the outer plate 30, and the outer ends 40 and 42 of the inner plate 32 are rigidly secured by welding or the like to the inner faces of the web portions 14 of the cross members 10 and 12 to retain the cross members inclined inwardly toward each other, as shown best in Figure 1, so that the same will frictionally engage the tire in a positive manner.

Struck outwardly from the leg portions 16 and 18 of the cross members 10 and 12, adjacent their outer flared extremities 24 and 26, are spring arms 44 and 46 that are adapted to frictionally engage the loose end of a tire chain (not shown) supporting the conventional chain locking device, or, more particularly, the free ends of the circumferential or side chains of a conventional anti-skid tire chain.

In practical use of the device, the cross members are applied to a pneumatic vehicle tire with the spring arms 44 and 46 engaging the ends of the circumferential chains on opposite sides of a tire, and the undulated or corrugated portions of the inner plate 30 engaging one length of one of the cross chains. The vehicle is then backed up slowly, the chain having been laid in a straight line behind the car with the circumferential chain on either side of the tire. This will permit the tire chain to form around the tire in a usual manner. In backing up the vehicle, care must be taken to stop just as the wheel and tire pass onto the plates 30 and 32. The chain can then be locked or fastened in the usual manner. The car is then driven forwardly, just enough so that the plates 30 and 32 are no longer between the pavement and the tire, facilitating the removal of the cross members 10 and 12 and plates 30 and 32 of the tire.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A tire chain applying device comprising a pair of substantially U-shaped resilient cross members adapted to yieldingly embrace a tire, said cross members having spaced leg portions and webs, a connector between said cross members, said connector including an arcuate outer plate and an undulated inner plate, said plates being terminally connected, said inner plate having end humps, the webs of said cross members being rigidly secured to said end humps, said cross members inclining toward each other, and spring arms struck from the leg portions of said cross members for engaging the ends of a tire chain.

2. A tire chain applying device comprising a pair of resilient cross members frictionally engaging the outer periphery of a tire, means carried by said members for supporting the ends of a tire chain, and an arcuate member terminally secured to the midportions of the cross members for engaging a cross chain of a tire chain, said arcuate member including an inner plate and an outer plate opposing the inner plate, said plates being connected at their outer ends, said inner plate having an undulated portion for engaging a cross chain of a tire chain, said undulated portion being fixed to the midportions of said cross members.

ALBERT L. BOZZELLI.

REFERENCES CITED

The following references are of record in the file of this patent:

UNITED STATES PATENTS

| Number | Name | Date |
|---|---|---|
| 1,217,125 | Palter | Feb. 20, 1917 |
| 1,222,458 | Peterson | Apr. 10, 1917 |
| 1,806,840 | Campbell | May 26, 1931 |
| 1,831,542 | Overtoom | Nov. 10, 1931 |
| 2,166,869 | Lees et al. | July 18, 1939 |
| 2,213,910 | Higgins et al. | Sept. 3, 1940 |